D. H. MONTGOMERY.
SPRING FOR MOTOR VEHICLES.
APPLICATION FILED MAY 18, 1920.
1,384,146.
Patented July 12, 1921.
2 SHEETS—SHEET 1.
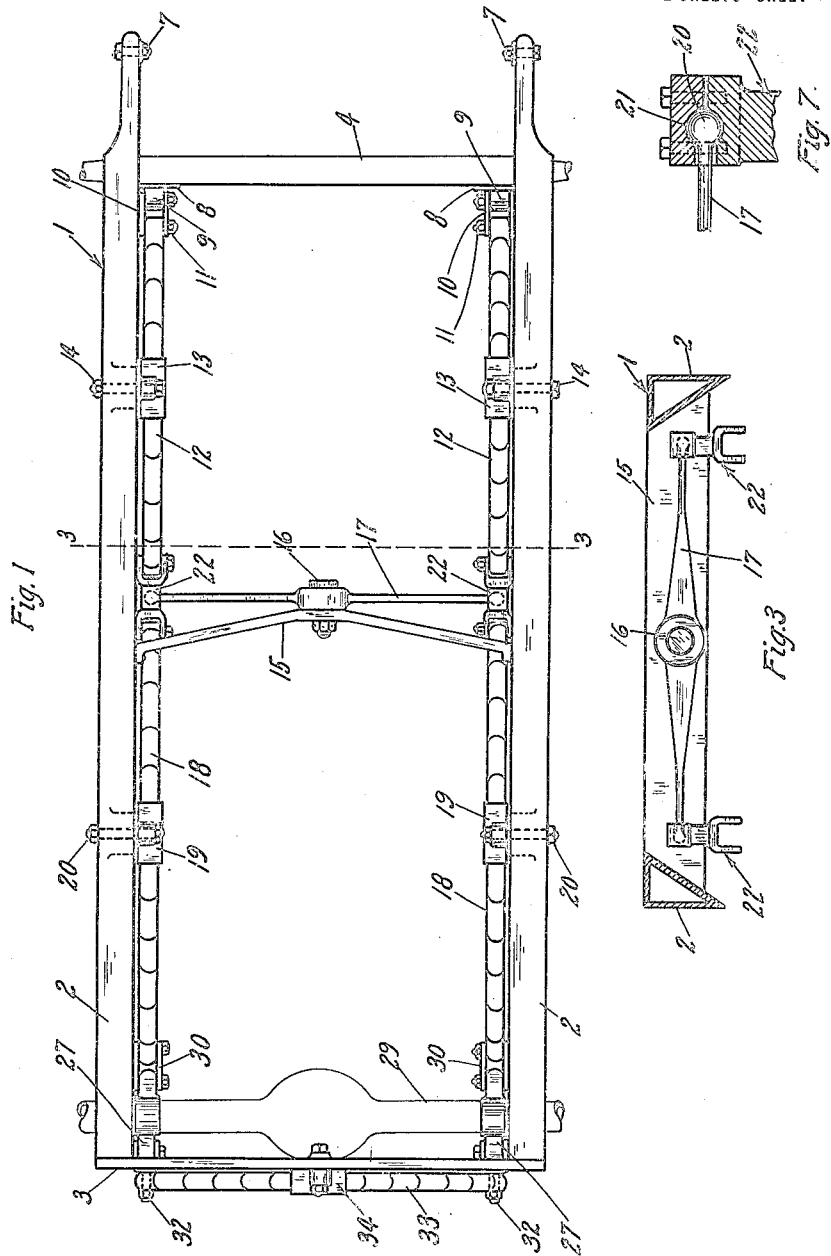
INVENTOR.
Don H. Montgomery
BY
ATTORNEY.

D. H. MONTGOMERY.
SPRING FOR MOTOR VEHICLES.
APPLICATION FILED MAY 18, 1920.
1,384,146.
Patented July 12, 1921.
2 SHEETS—SHEET 2.
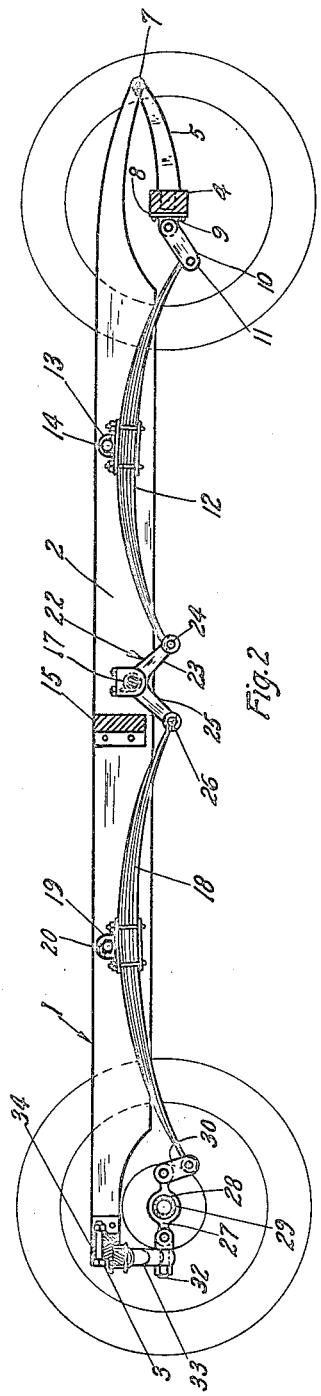
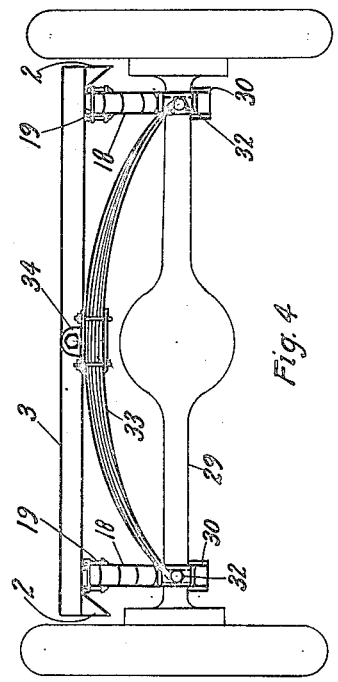
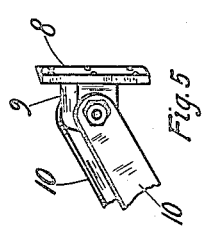
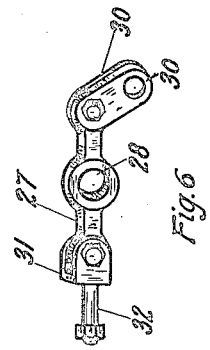
INVENTOR.
Donn H. Montgomery
BY
ATTORNEY.

UNITED STATES PATENT OFFICE.

DONN H. MONTGOMERY, OF DENVER, COLORADO.

SPRING FOR MOTOR-VEHICLES.

1,384,146.  Specification of Letters Patent.  Patented July 12, 1921.

Application filed May 13, 1920. Serial No. 382,420.

*To all whom it may concern:*

Be it known that I, DONN H. MONTGOMERY, a citizen of the United States, residing at Denver, in the county of Denver and State of Colorado, have invented new and useful Improvements in Springs for Motor-Vehicles, of which the following is a specification.

The present invention is directed to improvements in springs for motor vehicles.

The primary object of the invention is to provide a spring gear for motor vehicles so constructed and arranged that the shock and jars usually transmitted to the chassis, and thence to the body, from the wheels, are reduced to a minimum.

A further object of the invention is to provide a vehicle spring of this nature so constructed that it will last practically indefinitely, the same being extremely simple in construction, and consequently cheap to manufacture.

A still further object of the invention is to provide a spring of this character so constructed that each spring unit is so associated with the adjacent unit that the rebound of one will be counteracted by the remaining spring units.

With these and other objects in view, this invention resides in the novel features of construction, formation, combination and arrangement of parts to be hereinafter more fully described, claimed and illustrated in the accompanying drawings, in which:—

Figure 1 is a plan view of a motor vehicle frame showing the improved spring associated therewith.

Fig. 2 is a longitudinal sectional view through the same.

Fig. 3 is a sectional view on line 3—3 of Fig. 1.

Fig. 4 is a rear elevation.

Fig. 5 is a detail perspective view of one of the front connecting links.

Fig. 6 is a similar view of the rear connecting lever.

Fig. 7 is a sectional view through the ball and socket connection.

Referring to the drawings, 1 designates the chassis frame, which comprises side sills 2, the rear ends of which are rigidly connected by a transverse bar 3. These sills are preferably hollow and angular in cross section, as shown in Fig. 3 of the drawings.

The front axle 4 may be of any shape in cross section desired, and has rigidly attached thereto the inner ends of the arms 5, two of which are employed, said arms being slightly curved, and have their outer ends pivotally connected, as at 7, to the forward ends of the sills 2.

Since the springs and their connections associated with the sills 2 are identical in construction and arrangement, the description of one will suffice for both.

Suitably secured to the front axle 4 are plates 8, which are provided with ears 9, said ears having pivotal connection with the links 10, and pivotally connected between the links 10, as at 11, are the forward ends of the semi-elliptical springs 12. These springs are provided centrally with clips 13, said clips being pivotally connected with the bolts 14 which are suitably mounted on the sills 2.

A cross bar 15 is employed and has its ends suitably secured to the sills 2, said bar being provided with a central bolt or the like 16, and pivotally connected to the bolt 16 is a transversely disposed rocker arm 17, the purpose of which will appear later.

The springs 18 have clips 19 attached to their central portions, and these clips are pivotally connected to the bolts 20 carried by the sills 2.

The ends of the rocker arm 17 are formed with balls 20, said balls being engaged in sockets 21 carried by the bell crank levers 22, the arms 23 thereof being pivotally connected to the rear ends of the springs 12, as at 24, while the arms 25 are similarly connected, as at 26, to the forward ends of the springs 18, as clearly shown in Fig. 2 of the drawings.

Rock levers 27 are employed, and are formed with central bearings 28 for engaging the rear axle 29. The forward ends of the levers 27 are pivotally connected between the links 30, which are in turn pivotally connected with the rear ends of the springs 18. To the rear ends of the levers 27 are pivotally connected clips 31, said clips having rigidly connected thereto bolts 32, and to which are pivotally connected the ends of the semi-elliptical spring 33. The spring 33 is provided with a central clip 34 which is pivotally connected with the transverse bar 3. Thus it will be apparent that all springs are connected in such relation that a shock imparted to one will be transmitted to the others, and owing to the presence of the rocker arm 17, and the rear spring 33 shocks will be absorbed from one set of side springs by the other set on the opposite side.

It is obvious that should one of the front wheels, for example, the right hand one, strike an obstruction the axle 4 will move upwardly, whereupon the adjacent spring 12 will rock on its pivotal point, thus causing the rear end to move downwardly with the result that the associated bell crank lever 22 will rock so that the arm 25 thereof will compel the alined spring 18 to rock on its pivotal connection. When this occurs the rear end of the spring 18 moves downwardly, thus rocking the lever 27, whereupon the rear spring 33 is rocked in an obvious manner with the result that the shock is transmitted to the set or pair of springs on the opposite side of the frame.

What is claimed is:—

1. The combination with a vehicle frame and its associated front and rear axles, of springs pivotally connected in pairs with the sides of the frame, and pivotally connected with the respective axles, and means pivotally supported transversely of the frame for pivotally connecting the adjacent ends of the paired springs.

2. The combination with a vehicle frame and its associated front and rear axles, of a pair of springs pivotally connected with the sides of the frame, arms rigidly connected to the front axles and pivotally connected with the frame, and a rocker arm pivotally supported transversely of the frame and pivotally connecting the adjacent ends of each pair of springs.

3. The combination with a vehicle frame and its associated front and rear axles, of springs pivotally connected to the sides of the frame and longitudinally thereof, a spring pivotally supported transversely of the frame, means pivotally supported by the rear axle for pivotally connecting one set of the side springs and the transverse spring, means carried by the front axles for pivotally connecting the other set of side springs to the frame, and means for pivotally connecting the adjacent ends of the side springs.

4. The combination with a vehicle frame and its associated front and rear wheeled supported axles, a pair of springs pivotally connected with each side sill of the frame, means for pivotally connecting the adjacent ends of each pair of springs, a spring pivotally supported transversely of the frame and having pivotal engagement with the rear ends of one pair of the springs, and means for connecting one pair of the springs with the front axle.

5. The combination with a vehicle frame and its associated front and rear wheeled supported axles, of a pair of springs pivotally supported longitudinally of the side sills of the frame, means pivotally supported transversely of the frame for pivotally connecting the adjacent ends of the springs of each pair, and means for pivotally connecting the remote ends of each pair of springs to the front and rear axles, respectively.

6. The combination with a vehicle frame and its associated front and rear wheeled supported axles, a pair of springs pivotally connected with the sides of the frame, a spring pivotally supported by the frame and transversely thereof, levers rockably supported by the rear axle, means for pivotally connecting one pair of springs with the transverse spring, means for pivotally connecting the other pair of springs with the front axles, and means for pivotally connecting the adjacent ends of each pair of springs.

7. The combination with a vehicle frame and its associated front and rear axles, of a pair of springs pivotally connected with the sides of the frame, a rocker arm pivotally supported transversely of the frame, bell crank levers pivotally supported by the arm, the adjacent ends of the springs of each pair being pivotally connected to the bell crank levers, a spring pivotally supported transversely of the frame, means carried by the rear axles for pivotally connecting one pair of springs with the said spring, and means for pivotally connecting the ends of the other pair of springs with the front axles, and means for pivotally connecting the front axle with the frame.

8. The combination with a vehicle frame and its associated front and rear axles, arms carried by the front axles and being pivotally connected to the sides of the frame, a pair of springs pivotally supported by the sides of the frame, means for pivotally connecting the adjacent ends of each pair of springs, means for pivotally connecting one pair of the springs to the front axle, a single spring pivotally supported transversely of the frame, and means for pivotally connecting one pair of springs to the rear axle and single spring.

9. The combination with a vehicle frame and its associated front and rear axles, a rocker arm pivotally supported transversely of the frame, bell crank levers having universal pivotal connection with the ends of the arm, a pair of springs pivotally connected with the sides of the frame, the adjacent ends of each pair of springs being pivotally connected with the bell crank levers, means for pivotally connecting the front axle with the adjacent pair of springs, and means for pivotally connecting the adjacent pair of springs with the rear axle.

10. The combination with a vehicle frame and its associated front and rear axles, of a pair of springs pivotally connected with the sides of the frame, a spring pivotally supported transversely of the frame, levers rockably supported by the rear axle and pivotally connecting one pair of springs and the transverse spring, means for pivotally connecting the other pair of springs with the front axle, and means for pivotally connecting the adjacent ends of each pair of springs.

In testimony whereof I have hereunto set my hand in presence of two subscribing witnesses.

DONN H. MONTGOMERY.

Witnesses:
SULLIVAN V. JOHNSON,
AMY E. NACE.